March 26, 1963
B. T. SQUIER ETAL
3,082,899
BODIES FOR VEHICLES
Filed March 23, 1960
4 Sheets-Sheet 2
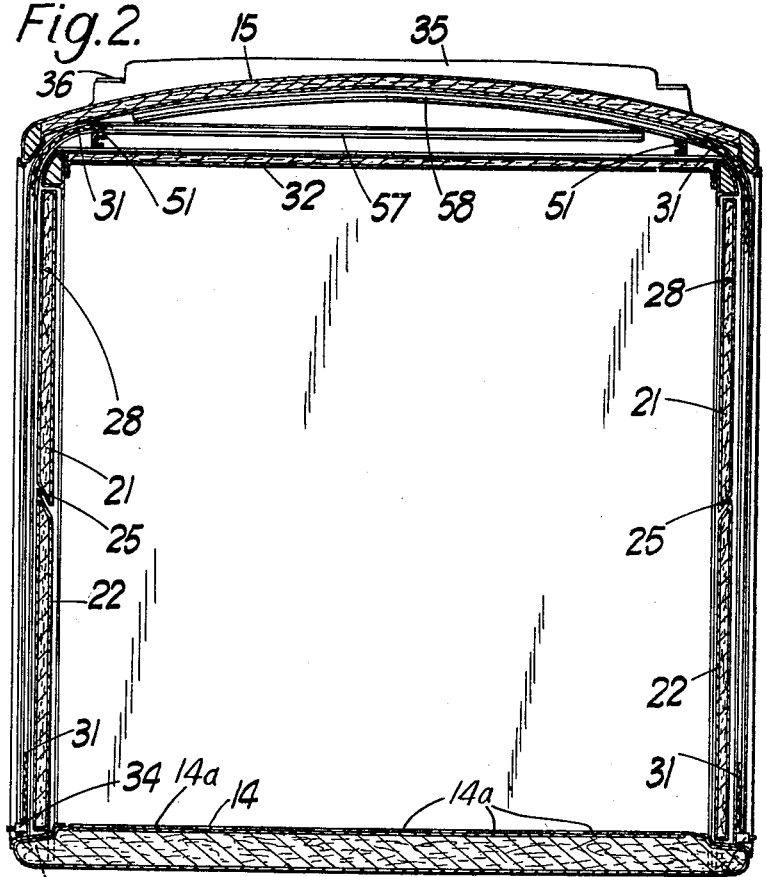
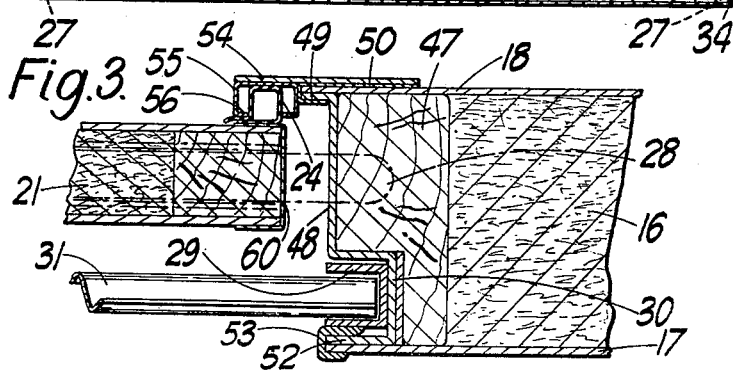

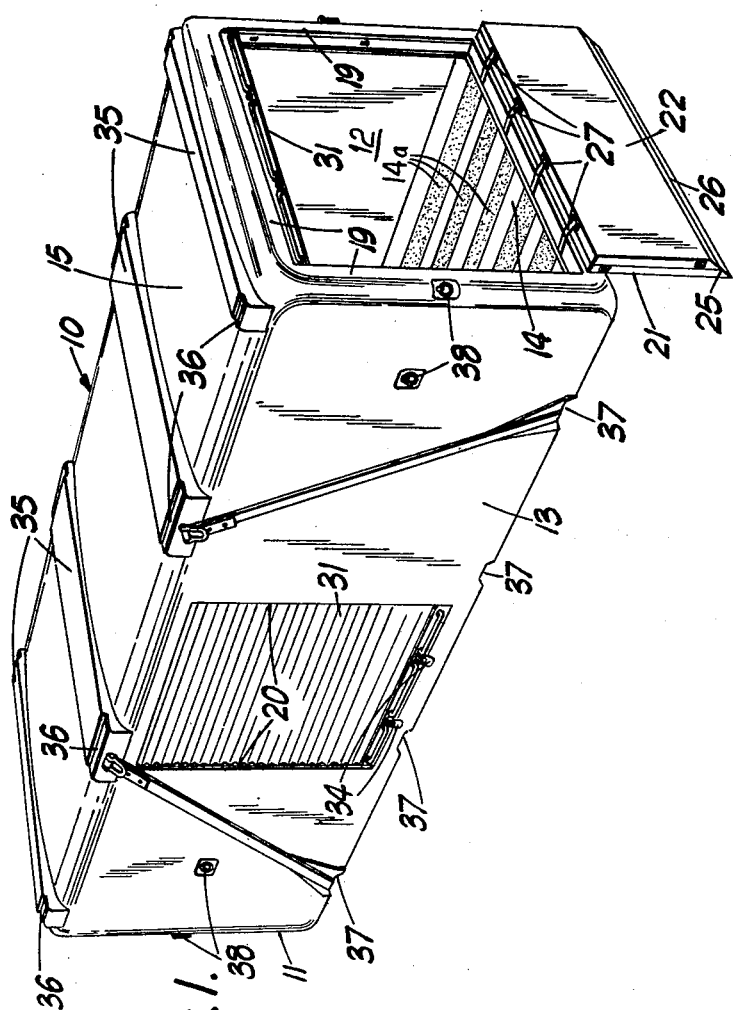

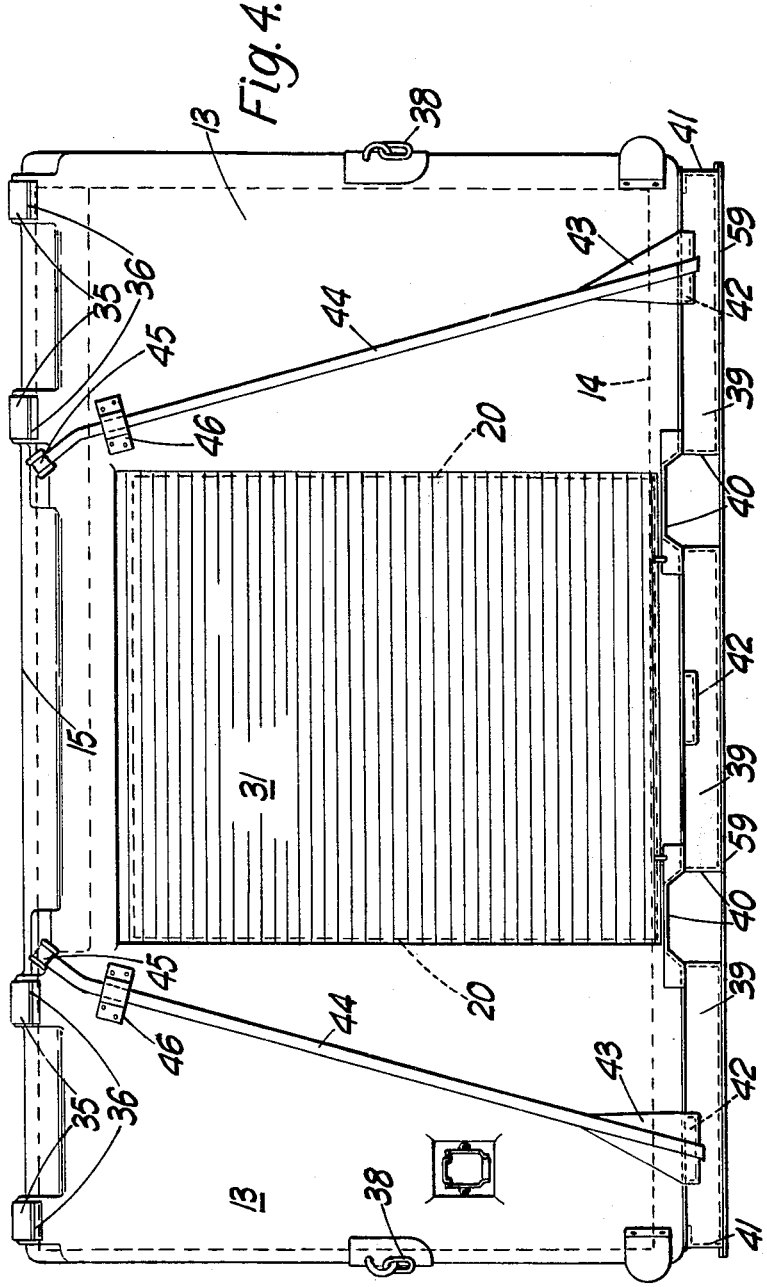

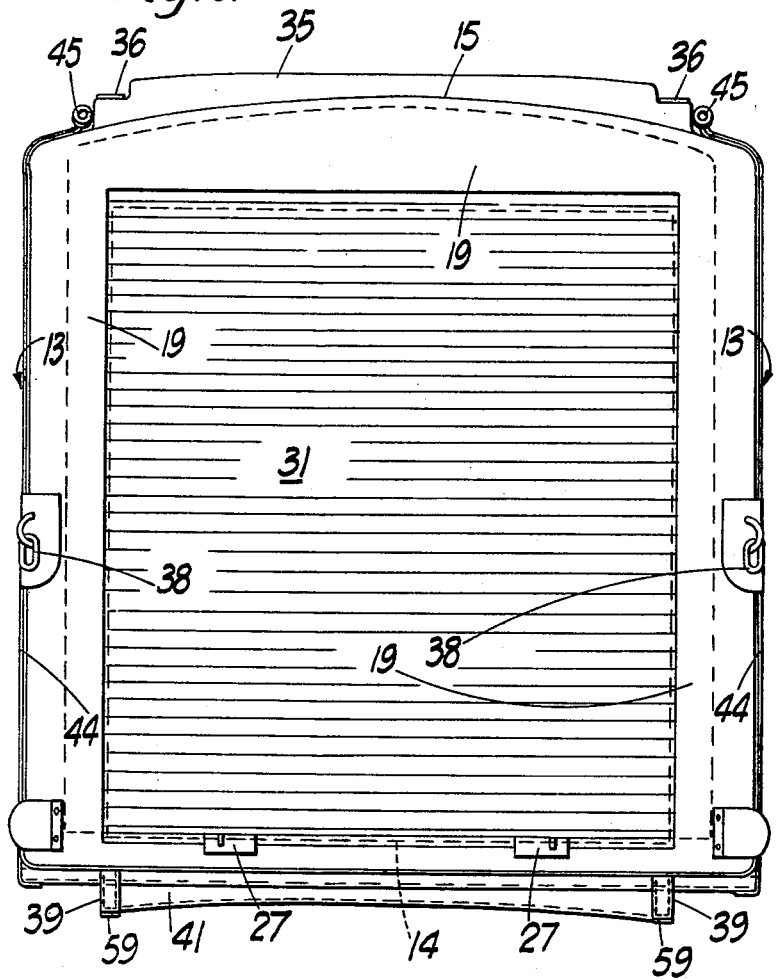

United States Patent Office 3,082,899
Patented Mar. 26, 1963

3,082,899
BODIES FOR VEHICLES
Benjamin Tinsley Squier, Kingston-on-Thames, and Thomas William Vernon Jervis, Moor Park, Hertfordshire, England, assignors to Mickleover Transport Limited, London, England, a company of Great Britain
Filed Mar. 23, 1960, Ser. No. 17,172
Claims priority, application Great Britain Mar. 24, 1959
10 Claims. (Cl. 220—1.5)

The invention relates to bodies for road, rail and air vehicles including so-called goods containers or detachable bodies commonly carried on flat road or rail trucks or trailer road vehicles.

According to the invention, a vehicle body is constructed comprising a metal under frame, a separately formed container supported by the under frame. The container is of general tubular form providing integral side walls, roof and floor, each comprising a sandwich of outer layers of resin bonded glass fibers secured to an intermediate layer of light density material. Suspension members are fixed to the sides of the under frame, extend upwardly therefrom and opposite the side walls of the container to terminate near the roof of the structure. Strengthening members are fixed to, and extend across the roof between the upper ends of the suspension members.

The light density material may comprise cork, balsa wood, foamed plastic, including foamed polyvinyl chloride, foamed polystyrene or foamed polyurethane, expanded ebonite, or expanded rubber or may be of cotton, glass-fibre or metal foil in the form of a honeycomb or other open structure.

The inner surfaces of the body or part thereof such as the floor may incorporate an abrasion resisting filler and there may be reinforcing members between the outer layers.

The following is a description of one form of goods container according to the invention, reference being made to the accompanying drawings in which:

FIGURE 1 is a perspective view of the container and showing a part of the cradle which accommodates it;

FIGURE 2 is a vertical cross-section through a container similar but not identical to that of FIGURE 1 and omitting the cradle;

FIGURE 3 is a horizontal section through a part of one side of the container showing a part of the opening therein and the associated flaps and sealing shutter;

FIGURE 4 is a side elevation of the container shown in FIGURE 2 on an enlarged scale; and showing it supported by the cradle and FIGURE 5 is a rear elevation of the arrangement shown in FIGURE 4.

The container is intended for carriage on a flat railway wagon and the body of the container is, generally, in the form of a large square section tube indicated generally at 10 closed by an end wall 11 at one end and open at 12 at the other end. The end wall 11, side walls 13, floor 14 and roof 15 of the body are constructed, as a single unit, of a sandwich of a light density material 16 (see FIGURE 3) such as cork or foamed plastic (e.g. foamed polyvinyl chloride, foamed polystyrene or foamed polyurethane) which is of substantial thickness (e.g. one to two or more inches) and is disposed between inner and outer layers 17 and 18 of synthetic resin bonded glass fibres.

At the open end 12, the side walls 13 and roof 15 are turned inwardly to form a small internal flange 19 around the opening 12 as best seen in FIGURE 1.

In addition to the end opening, there is an opening 20 of similar size and shape near the centre of each side 13.

The three openings have similar closure means and shutters, which forms the subject matter of patent application Serial No. 17,173, filed March 23, 1960, and now abandoned.

Each opening has an inner closure which consists of two rectangular flaps 21, 22 each constructed of a sandwich of the above materials. The flaps extend transversely across the opening one above the other and together fill the opening completely.

As will be seen from FIGURE 3 parts of the outer layers 17 and 18 of resin bonded glass fibres project beyond the light density material 16 so as to embrace a wood pillar 47 on each side of the opening. The pillar is held in position by a plastics skin 48 bonded to said projecting parts. A flange 49 is formed along the edge of the plastics skin at the inner side of the opening and is secured to the projecting part of the layer 18 by bonding and protected by a thin metal strip which is bent around these parts. The portion of the plastics skin 48 towards the outside of the opening is shaped to provide a channel guide 30 which is held in position by screws (not shown). The outer flange 52 of the channel guide butts and is bonded to a projecting part of the layer 17 and is protected by a metal clip 53. Secured within the channel is the guideway 29 on which slides the edge of a corrugated fibre glass shutter 31. A metal plate 54 is secured through a metal strip 50 to the wood pillar 47 by screws (not shown). Fixed to the plate is a socket member 55 of channel formation having inwardly directed portions 56 at its mouth which grip a hollow resilient packing piece 24 made of rubber against which the rectangular flaps 21, 22 may rest. The edges of the flaps are embraced by a channel section metal binder 60 which is secured to them by screws (not shown).

The two flaps are hinged together at 25 along their adjacent horizontal edges so that the upper flap 21 may be folded outwardly and downwardly to lie against the outer surface of the lower flap 22. The adjacent edges of the two flaps which are hinged together lie in a plane which extends upwardly and outwardly (e.g. at somewhere between 45° and 60° to the vertical so that when the flaps are folded as aforesaid, the two edges co-operate to form a slope or ramp 26. This ramp assists in loading and unloading when the flaps are in the platform position later described. Metal plates (not shown) may be embedded in the surfaces of the ramp as a protection for the edges of the flaps.

The lower flap is hinged at its lower edge to the floor of the body, the hinges 27 being of the kind sometimes known as swan neck hinges, and permitting the unit which consists of the two flaps folded together, to swing outwardly and downwardly to hang downwardly outside the mouth of the opening. In this position the lower flap 22 lies outside the upper flap 21.

The unit may also be held in an intermediate substantially horizontal position in which it serves as a loading platform or bridge. The flap which is hinged directly to the floor is then uppermost. Chains or other stays (not shown) may be provided for holding the unit in this position or it may rest on an external support. Bolts or latches 28 are provided for securing the flaps in the closed position and in the folded position.

When raised the shutter at the end of the body is received by a guideway 51 (see FIGURE 2) in a space provided between an internal false roof 32 and the main roof 15 of the container. The shutters of the two side openings are likewise received in this space by guideways 57, 58 which overlap one another.

Means 34 are provided for locking and sealing the shutters in their closed positions.

The inner closures serve as a protection for the shutters against sliding loads and also as thermal insulation.

It is an advantage of the method of the construction by moulding, that it facilitates local modifications in the shape and thickness of the walls of the structure. This facility is used in the present construction to provide on the top of the roof four transverse ribs or bars 35 of increased thickness. Two of these bars are about one-third of the length of the tube from each end respectively and provide lateral stiffness to resist compressive forces across the roof imparted by a lifting sling used without stretcher bars and attached to a cradle, later described. The other two bars 35 are close to the ends of the tube and the four bars cooperate to form a seating for the cradle of a second container if placed on top of the container being described. Each bar is stepped downwardly at 36 at its ends and provided with a metal bearing plate (not shown) moulded into the structure, for the rails of the cradle of the second container. In the underside of the floor there are formed two transverse grooves 37 (FIGURE 1) to receive the cross-bars of the cradle hereinafter referred to.

A further advantage of the method of construction is that it facilitates the anchoring of fittings to the body. In the present instance there are, near each end of each side, two eyes or rings 38 secured to anchor plates moulded into the structure. These are for use in securing the container to the platform of a vehicle. There may also be provided anchor means by which wheel axles may be attached directly to the container, although such anchor means are not embodied in this particular example.

The above-mentioned cradle serves to support the container body during lifting and is intended to remain with the body while being separable therefrom for maintenance and repair. The cradle comprises a bottom frame composed of two longitudinal rails 39 and seven interconnecting cross members which project outwardly from the longitudinal rails. The longitudinal rails are of deep U-shaped section and the flanges are formed with interruptions in which the cross members are welded. Skid bars 59 are secured to the underside of the rails. Two of these cross members 40 are of deep box section with open ends and suitably spaced apart to provide access for fork lift truck prongs. The longitudinal members 39 are completely interrupted at these points and the parts thereof are joined together by the sides of the cross members. A Z-section member 41 is provided at each end of the underframe and three shallow box section members 42 provided one between the two deep section cross members 40 and one between each cross member 40 and a Z-section member 41. The seven cross-members are constituted by the two members 40, the two members 41 and the three members 42. The ends of the two outermost members 42 on each side of the body are directly connected by gusset plates 43 to tension bars 44 which, slope upwardly and towards one another to bring their upper ends into line with the ends of the two inner ribs 35 on the top of the body. Here the tension bars have eyes 45 for attachment of a lifting sling. The tension members are not rigidly attached at their upper ends to the body but they may be threaded through loops 46 on the body to limit their movement relative to the body.

The floor surface may incorporate abrasion resistant or friction material such as powdered aluminum oxide, granite dust or slate dust or it may have strips 14a of non-skid material bonded into it or it may be given a rough sand finish, in each case in order to reduce any tendency for loads to slide on the floor during transportation and to increase the life of the floor.

If the container or other body is to be used for carrying food, the internal surfaces may have a light textile fabric (e.g. cotton scrim) rolled into the surface before the resin is cured so that the fabric becomes impregnated with the resin.

A fire retardant may be incorporated in the body materials.

As indicated above the low density material may comprise cork, balsa wood, foamed plastics, including foamed polyvinyl chloride, foamed polystyrene or foamed polyurethane, expanded ebonite or expanded rubber or cotton, glass-fibre or metal foil in the form of a honeycomb or other open structure.

We claim:
1. A vehicle body comprising in combination a metal under frame, a separately formed container supported by the said frame and of general tubular form providing integral side walls, roof and floor each comprising a sandwich of outer layers of resin bonded glass fibers secured to an intermediate layer of light density material, suspension members fixed to the sides of the said under frame and extending upwardly therefrom and opposite the side walls of the container without positive attachment thereto and terminating near the roof of the said container, and strengthening members fixed to and extending across the said roof between the upper ends of the said suspension members.

2. A vehicle body according to claim 1 wherein the light density material is a member consisting of cork; balsa wood; foamed polyvinyl chloride; foamed polystyrene; foamed polyurethane; expanded ebonite; expanded rubber; cotton, glass-fibre, metal foil in the form of an open structure.

3. A vehicle body according to claim 1 wherein said frame comprises two longitudinal members between which extend a number of cross members and two of said cross members are spaced apart one on either side of the centre of the body away from the ends thereof and which cross members are open ended for receiving the arms of a fork lift truck.

4. A vehicle body according to claim 3 wherein certain of said cross members extend above the longitudinal members and wherein the bottom wall of the container is recessed to accommodate these cross members.

5. A vehicle body according to claim 3 wherein certain of the said cross members extend above the longitudinal members and wherein the bottom wall of the container is recessed to accommodate these cross members.

6. A vehicle body according to claim 1 wherein said suspension members extend through loops secured to the side walls of the said container.

7. A vehicle body according to claim 1 wherein the floor of the container has strips of non-skid material bonded into it.

8. A vehicle body according to claim 1 for transporting food wherein the internal surfaces of the container are covered by a light textile fabric rolled into the surface thereof before the resin is set.

9. A vehicle body according to claim 1 wherein a fire proofing agent is incorporated in the bonded material.

10. A vehicle body according to claim 1 wherein the floor of the container is given a rough sand finish for the purpose described.

References Cited in the file of this patent
UNITED STATES PATENTS

| | | |
|---|---|---|
| 1,606,846 | Smith | Nov. 16, 1926 |
| 1,874,901 | Christiansen | Aug. 30, 1932 |
| 1,937,615 | Willoughby | Dec. 5, 1933 |
| 2,003,287 | Fitch | June 4, 1935 |
| 2,073,990 | Koch | Mar. 16, 1937 |
| 2,552,641 | Morrison | May 15, 1951 |
| 2,609,068 | Pajak | Sept. 2, 1952 |
| 2,664,219 | Schmidt | Dec. 29, 1953 |
| 2,685,398 | King | Aug. 3, 1954 |
| 2,714,516 | Brown | Aug. 2, 1955 |
| 2,725,271 | Cunningham | Nov. 29, 1955 |
| 2,893,076 | Herts | July 7, 1959 |

FOREIGN PATENTS

| | | |
|---|---|---|
| 796,450 | Great Britain | June 11, 1958 |